(12) United States Patent
Tomita

(10) Patent No.: US 10,808,796 B2
(45) Date of Patent: Oct. 20, 2020

(54) TORQUE FLUCTUATION INHIBITING DEVICE, TORQUE CONVERTER AND POWER TRANSMISSION DEVICE

(71) Applicant: EXEDY Corporation, Neyagawa-shi, Osaka (JP)

(72) Inventor: Yusuke Tomita, Neyagawa (JP)

(73) Assignee: EXEDY CORPORATION, Neyagawa-Shi, Osaka (JP)

( * ) Notice: Subject to any disclaimer, the term of this patent is extended or adjusted under 35 U.S.C. 154(b) by 0 days.

(21) Appl. No.: 16/217,745

(22) Filed: Dec. 12, 2018

(65) Prior Publication Data
US 2019/0226553 A1 Jul. 25, 2019

(30) Foreign Application Priority Data
Jan. 19, 2018 (JP) ................................ 2018-006968

(51) Int. Cl.
*F16F 15/14* (2006.01)
*F16H 45/02* (2006.01)

(52) U.S. Cl.
CPC ........ *F16F 15/145* (2013.01); *F16F 15/1464* (2013.01); *F16H 45/02* (2013.01); *F16F 2230/0064* (2013.01); *F16H 2045/0221* (2013.01)

(58) Field of Classification Search
CPC ...... F16F 15/145; F16F 15/1464; F16H 45/02
USPC ........................................................ 60/338
See application file for complete search history.

(56) References Cited

FOREIGN PATENT DOCUMENTS

| JP | 2011-185307 A | 9/2011 |
| JP | 2016-142404 A | 8/2016 |
| JP | 2017-053467 A | 3/2017 |
| JP | 2017-072167 A | 4/2017 |

OTHER PUBLICATIONS

Office Action (Notification of Reasons for Refusal) of the corresponding Japanese Application No. 2018-006968, dated Jan. 28, 2020, 7 pp.
Office Action of the corresponding Japanese Application No. 2018-006968, dated Jul. 28, 2020, 5 pp.

*Primary Examiner* — Thomas E Lazo
*Assistant Examiner* — Daniel S Collins
(74) *Attorney, Agent, or Firm* — United IP Counselors, LLC

(57) ABSTRACT

A torque fluctuation inhibiting device for inhibiting torque fluctuations in a rotor to which a torque is inputted is disclosed. The torque fluctuation inhibiting device comprises a mass body, a plurality of drag mechanisms, and a restriction mechanism. The mass body is disposed to be rotatable with the rotor and to be rotatable relative to the rotor. Each of the plurality of drag mechanisms is for generating a circumferential force when a relative displacement is produced between the rotor and the mass body in a rotational direction. The circumferential force is directed to reduce the relative displacement. The restriction mechanism is for restricting actuation of one or more of the plurality of drag mechanisms.

10 Claims, 7 Drawing Sheets

TORQUE FLUCTUATION INHIBITING DEVICE, TORQUE CONVERTER AND POWER TRANSMISSION DEVICE

CROSS-REFERENCE TO RELATED APPLICATIONS

This application claims priority to Japanese Patent Application No. 2018-006968, filed Jan. 19, 2018. The contents of that application are incorporated by reference herein in their entirety.

BACKGROUND OF THE INVENTION

1. Field of the Invention

The present invention relates to a torque fluctuation inhibiting device, particularly to a torque fluctuation inhibiting device for inhibiting torque fluctuations in a rotor, to which a torque is inputted, and that is rotated about a rotational axis. Additionally, the present invention relates to a torque converter and a power transmission device, each of which includes the torque fluctuation inhibiting device.

2. Description of the Related Art

For example, a clutch device, including a damper device, and a torque converter are provided between an engine and a transmission in an automobile. For reduction in fuel consumption, the torque converter is provided with a lock-up device for mechanically transmitting a torque at a predetermined rotational speed or greater.

Japan Laid-open Patent Application Publication No. 2017-53467 describes a lock-up device including a torque fluctuation inhibiting device. The torque fluctuation inhibiting device described in Japan Laid-open Patent Application Publication No. 2017-53467 includes an inertia ring, a plurality of centrifugal elements and a plurality of cam mechanisms. The inertia ring is rotatable relatively to a hub flange to which a torque is transmitted, and a centrifugal force acts on each centrifugal element in rotation of the hub flange and the inertia ring. Each cam mechanism includes a cam provided on the surface of each centrifugal element and a cam follower making contact with the cam.

In the device described in Japan Laid-open Patent Application Publication No. 2017-53467, when the hub flange and the inertia ring are displaced in a rotational direction by torque fluctuations, each cam mechanism is actuated in response to the centrifugal force acting on each centrifugal element, and converts the centrifugal force acting on each centrifugal element into a circumferential force directed to reduce the displacement between the hub flange and the inertia ring. Torque fluctuations are inhibited by this circumferential force.

Recently, there has been proposed a type of vehicle engine equipped with a function to deactivate cylinders in part (e.g., two of four cylinders) in low load operation or so forth. In such a cylinder deactivation engine (variable displacement engine), combustion order varies with the number of cylinders to be actuated. Therefore, when greatly fluctuating characteristics designed for actuating two cylinders are set for the torque fluctuation inhibiting device, torque fluctuations cannot be inhibited in actuating four cylinders, and rather, performance of inhibiting torque fluctuations could get worse than when the torque fluctuation inhibiting device is not installed in the vehicle engine.

SUMMARY OF THE INVENTION

It is an object of the present invention to provide a torque fluctuation inhibiting device that can effectively inhibit vibration and so forth of a vehicle operable with different combustion orders.

(1) A torque fluctuation inhibiting device according to the present invention is a device inhibiting torque fluctuations in a rotor to which a torque is inputted. The torque fluctuation inhibiting device includes a mass body, a plurality of drag mechanisms and a restriction mechanism. The mass body is disposed to be rotatable with the rotor and be rotatable relatively to the rotor. The plurality of drag mechanisms each generates a circumferential force when a relative displacement is produced between the rotor and the mass body in a rotational direction, and the circumferential force is directed to reduce the relative displacement. The restriction mechanism restricts actuation of one or more selected from the plurality of drag mechanisms.

When a torque is inputted to the rotor in this device, the rotor and the mass body are rotated. When the torque inputted to the rotor does not fluctuate, the relative displacement is not produced between the rotor and the mass body in the rotational direction. On the other hand, when the torque inputted to the rotor fluctuates, the relative displacement is produced between the mass body and the rotor in the rotational direction (the displacement will be hereinafter expressed as "rotational phase difference" on an as-needed basis) depending on the extent of torque fluctuations, because the mass body is disposed to be rotatable relatively to the rotor.

When the herein described relative displacement is produced between the rotor and the mass body in the rotational direction, each drag mechanism generates the circumferential force directed to reduce the relative displacement between the rotor and the mass body. Torque fluctuations are inhibited by the herein described actuation of each drag mechanism.

Additionally, actuation of any one or more of the plurality of drag mechanisms can be restricted by the restriction mechanism. Because of this, when the present device is installed in a vehicle having a cylinder deactivation function, for instance, the number of drag mechanisms to be actuated can be set in accordance with the number of cylinders to be deactivated, i.e., a combustion order. Therefore, vibration of the vehicle can be effectively inhibited.

(2) Preferably, the plurality of drag mechanisms include a plurality of centrifugal elements and a plurality of cam mechanisms. The plurality of centrifugal elements are each disposed to receive a centrifugal force generated in rotation of the rotor and the mass body. The cam mechanism converts the centrifugal force acting on the each of the plurality of centrifugal elements into the circumferential force. In this case, the restriction mechanism restricts actuation of one or more of the plurality of centrifugal elements in the one or more selected from the plurality of drag mechanisms.

When the rotor and the mass body are herein rotated, the each of the plurality of centrifugal elements receives a centrifugal force. Then, when the relative displacement is produced between the rotor and the mass body in the rotational direction, the cam mechanism converts the centrifugal force acting on the each of the plurality of centrifugal elements into the circumferential force. The circumferential force acts to reduce the relative displacement between the rotor and the mass body. Torque fluctuations are inhibited by the herein described actuation of the cam mechanism.

The centrifugal force acting on the each of the plurality of centrifugal elements is herein used as a force for inhibiting torque fluctuations. Hence, a characteristic of inhibiting torque fluctuations varies in accordance with the rotational speed of the rotor. Additionally, the characteristic of inhibiting torque fluctuations can be appropriately set by, for instance, the cam shape or so forth. Hence, a peak of torque fluctuations can be reduced in as wide a rotational speed range as possible.

(3) Preferably, the rotor receives the torque inputted thereto from an engine including a plurality of cylinders. In this case, the restriction mechanism restricts actuation of the one or more of the plurality of centrifugal elements, and a number of the one or more of the plurality of centrifugal elements is set in accordance with a number of one or more deactivated cylinders in the plurality of cylinders.

When the present device is herein installed in a vehicle having a cylinder deactivation function, vibration can be effectively inhibited in accordance with a combustion order.

(4) Preferably, the restriction mechanism restricts the one or more of the plurality of centrifugal elements from moving radially outward. Here, the one or more of the plurality of centrifugal elements are restricted from moving radially outward. In other words, the centrifugal force is restricted from acting on each of the one or more of the plurality of centrifugal elements. Hence, actuation of each of the one or more of the plurality of centrifugal elements is restricted.

(5) Preferably, the plurality of centrifugal elements are put into one or more pairs of centrifugal elements disposed in opposition to each other through a rotational center of the rotor. Additionally, the one or more of the plurality of centrifugal elements restricted from being actuated by the restriction mechanism corresponds to at least one of the one or more pairs of centrifugal elements disposed in opposition to each other.

The plurality of centrifugal elements are herein disposed in good balance, whereby occurrence of unbalance is inhibited in rotation. Additionally, restriction is imposed on actuation of the at least one of the one or more pairs of centrifugal elements disposed in opposition to each other. Hence, occurrence of unbalance can be avoided in actuation of the present device.

(6) Preferably, the cam mechanism includes a cam and a cam follower. The cam is provided on one of the mass body and the each of the plurality of centrifugal elements. The cam follower is provided on the other of the mass body and the each of the plurality of centrifugal elements, and is moved along the cam. In this case, the restriction mechanism causes the cam and the cam follower to be not in contact with each other.

Here, movement of the one or more of the plurality of centrifugal elements is restricted, whereby the cam and the cam follower, composing the cam mechanism, do not make contact with each other. In other words, actuation of the cam mechanism is restricted.

(7) Preferably, the rotor includes a plurality of recessed portions, each of which is opened radially outward, on an outer peripheral surface thereof, and the each of the plurality of recessed portions accommodates the each of the plurality of centrifugal elements.

(8) Preferably, the mass body includes a first inertia ring, a second inertia ring and a pin. The first and second inertia rings are disposed in opposition to each other through the rotor. The pin couples the first and second inertia rings to each other so as to make the first and second inertia rings non-rotatable relatively to each other. The each of the plurality of centrifugal elements is disposed on an outer peripheral part of the rotor and on an inner peripheral side of the pin, while being disposed between the first inertia ring and the second inertia ring in an axial direction. The cam follower is a cylindrical roller including a hole that an interior thereof is penetrated by the pin in the axial direction. The cam is provided on the each of the plurality of centrifugal elements so as to make contact with the cam follower, and has a shape making the circumferential force vary in accordance with an amount of the relative displacement between the rotor and the mass body in the rotational direction.

Attachment of the cam follower is herein done by utilizing the pin coupling the first inertia ring and the second inertia ring. Therefore, the cam mechanism is simplified in configuration.

(9) A torque converter according to the present invention is disposed between an engine and a transmission. The torque converter includes an input-side rotor to which a torque is inputted from the engine, an output-side rotor outputting the torque to the transmission, a damper disposed between the input-side rotor and the output-side rotor, and the torque fluctuation inhibiting device configured as any of the above.

(10) A power transmission device according to the present invention includes a flywheel, a clutch device and the torque fluctuation inhibiting device configured as any of the above. The flywheel includes a first inertia body rotated about a rotational axis, a second inertia body, which is rotated about the rotational axis and is rotatable relatively to the first inertia body, and a damper disposed between the first inertia body and the second inertia body. The clutch device is provided on the second inertia body of the flywheel.

Overall, in the present invention described above, when the present device is applied to a vehicle operable with different combustion orders, for instance, vibration of the vehicle can be effectively inhibited.

DETAILED DESCRIPTION OF THE PREFERRED EMBODIMENTS

Figure 1:
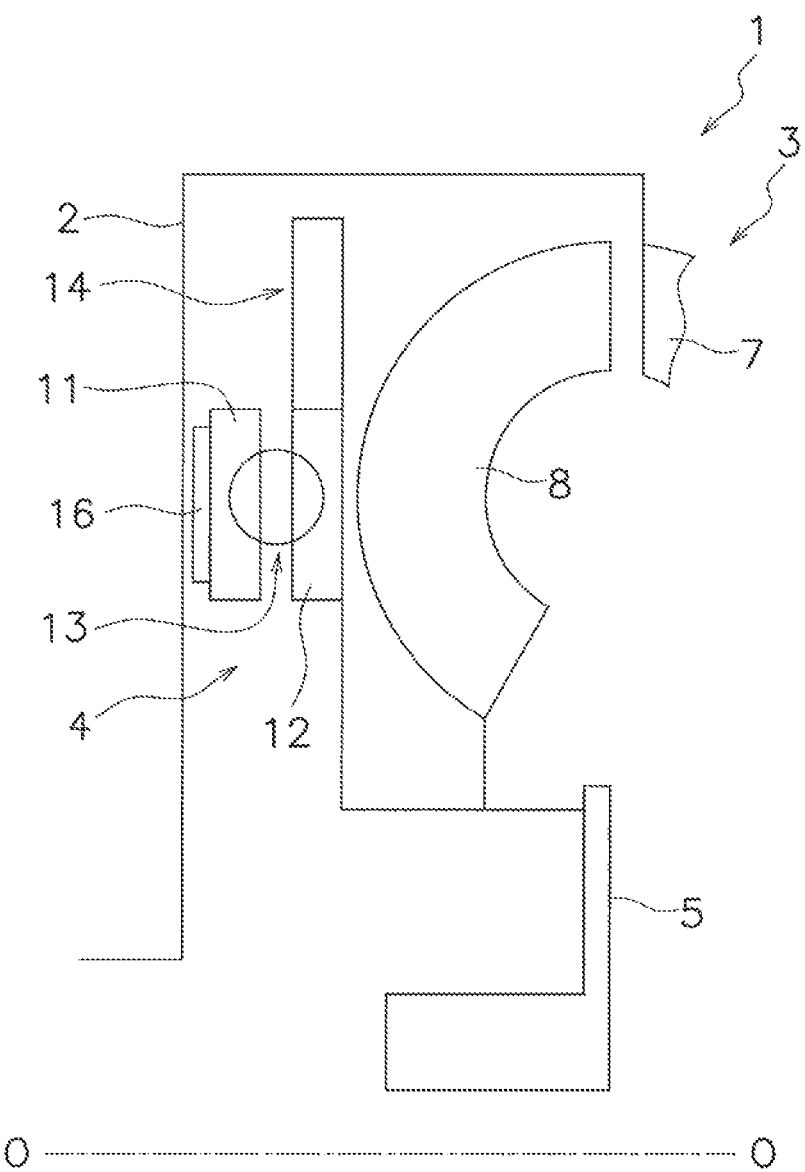
FIG. 1 is a schematic diagram of a torque converter according to a preferred embodiment of the present invention.
Figure 2:
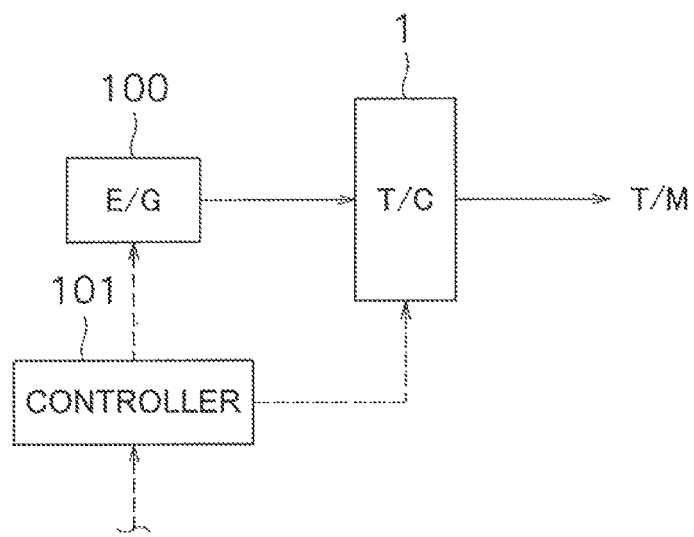
FIG. 2 is a schematic diagram of a drive system including the torque converter shown in FIG. 1.

FIG. 1 is a schematic diagram of a torque converter 1 employing a torque fluctuation inhibiting device according to a preferred embodiment of the present invention. In FIG. 1, line O-O indicates a rotational axis of the torque converter 1. Additionally, FIG. 2 is a block diagram of a drive system including the torque converter 1 shown in FIG. 1. The drive system includes an engine 100, to which the torque converter 1 is coupled, and a controller 101. The engine 100 has a cylinder deactivation function by which cylinders in part can be deactivated in accordance with a load or so forth. The controller 101 controls the cylinder deactivation function of the engine 100 in response to a detection signal inputted thereto from a load sensor or so forth (not shown in the drawings), and restricts actuation of the torque fluctuation inhibiting device installed in the torque converter 1 in accordance with the number of cylinders to be deactivated.

[Entire Configuration of Torque Converter 1]

The torque converter 1 includes a front cover 2, a torque converter body 3, a lock-up device 4 and an output hub 5. A torque is inputted to the front cover 2 from the engine 100. The torque converter body 3 includes an impeller 7 coupled to the front cover 2, a turbine 8 and a stator (not shown in the drawings). The turbine 8 is coupled to the output hub 5, and an input shaft of a transmission (not shown in the drawings) is capable of being spline-coupled to the inner peripheral part of the output hub 5.

[Lock-Up Device 4]

The lock-up device 4 includes a clutch part, a piston to be actuated by hydraulic pressure, and so forth, and is settable to a lock-up on state and a lock-up off state. In the lock-up on state, the torque inputted to the front cover 2 is transmitted to the output hub 5 through the lock-up device 4 without through the torque converter body 3. On the other hand, in the lock-up off state, the torque inputted to the front cover 2 is transmitted to the output hub 5 through the torque converter body 3.

The lock-up device 4 includes an input-side rotor 11, a hub flange 12 (rotor), a damper 13 and a torque fluctuation inhibiting device 14.

The input-side rotor 11 includes an axially movable piston, and is provided with a friction member 16 fixed to the front cover 2-side lateral surface thereof. When the friction member 16 is pressed onto the front cover 2, the torque is transmitted from the front cover 2 to the input-side rotor 11.

The hub flange 12 is disposed in axial opposition to the input-side rotor 11, and is rotatable relatively to the input-side rotor 11. The hub flange 12 is coupled to the output hub 5.

The damper 13 is disposed between the input-side rotor 11 and the hub flange 12. The damper 13 includes a plurality of torsion springs, and elastically couples the input-side rotor 11 and the hub flange 12 in a rotational direction. The damper 13 transmits the torque from the input-side rotor 11 to the hub flange 12, and also, absorbs and attenuates torque fluctuations.

[Torque Fluctuation Inhibiting Device 14]

Figure 3:
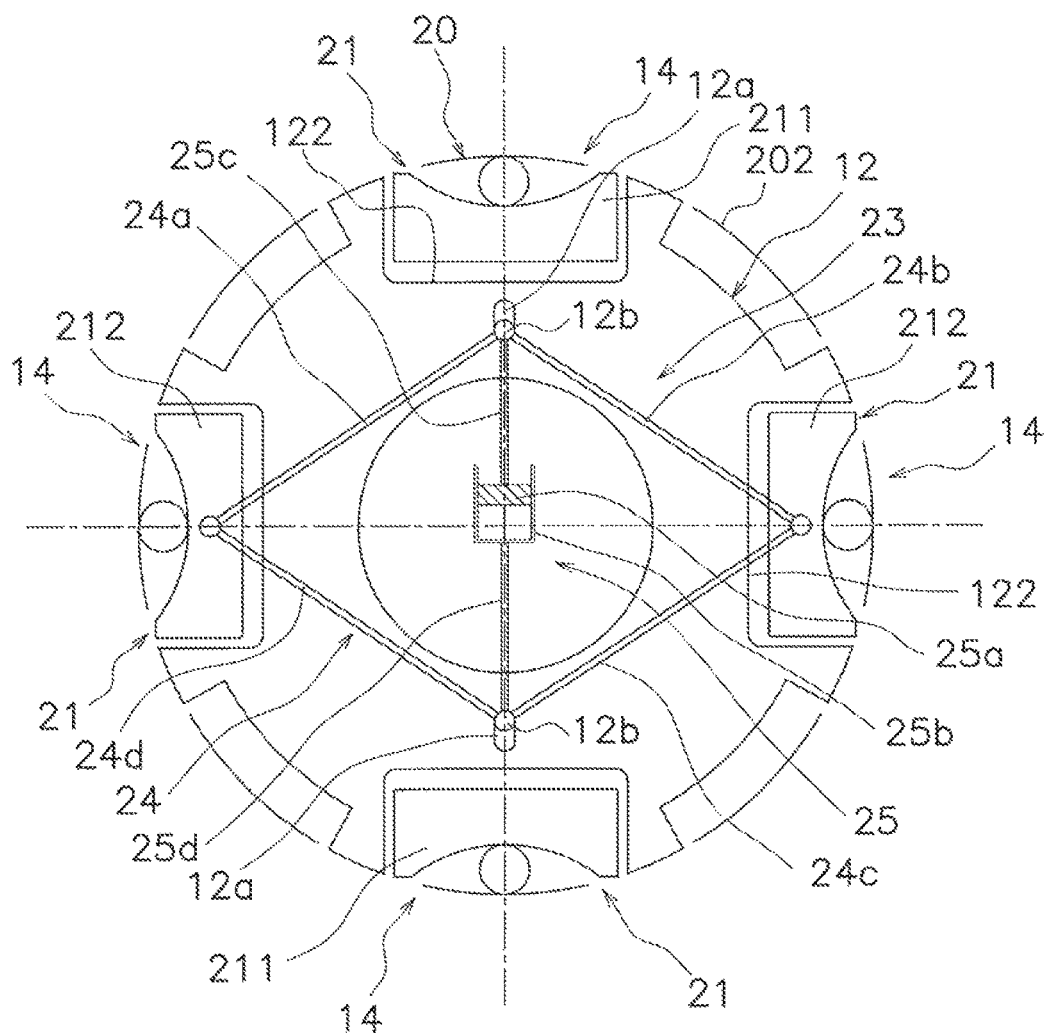
FIG. 3 is a schematic front view of a hub flange and a cam mechanism shown in FIG. 1.
Figure 4:
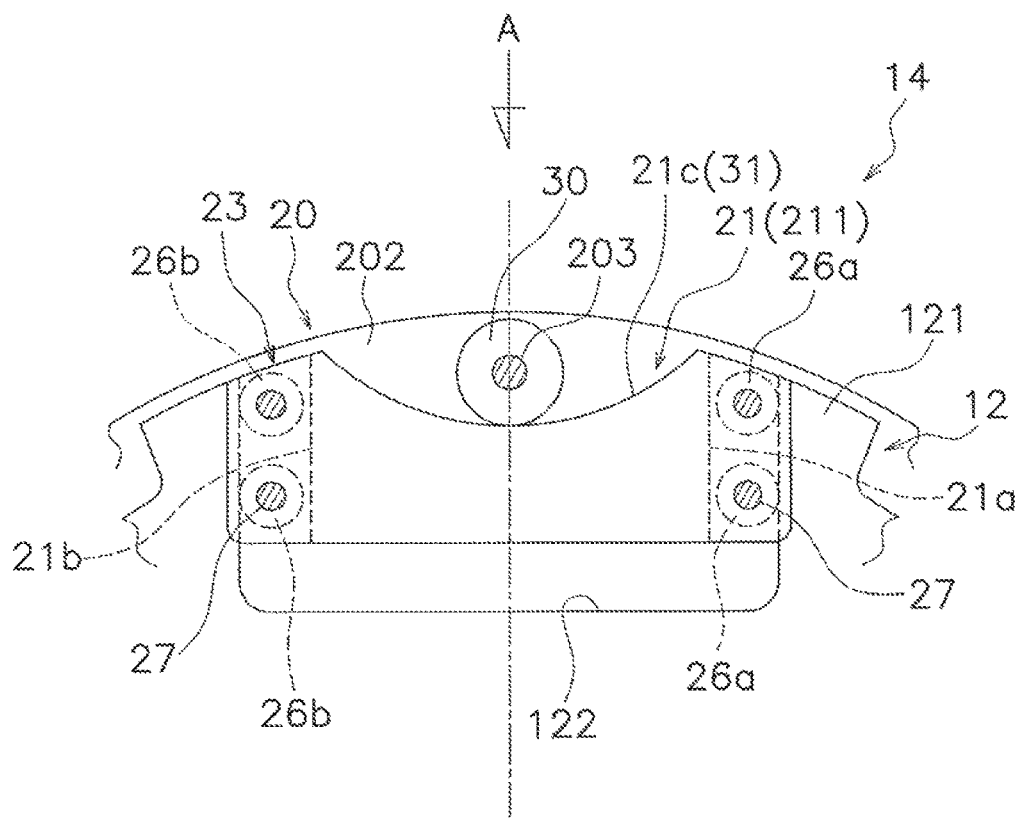
FIG. 4 is a partial front view of the hub flange and a torque fluctuation inhibiting device shown in FIG. 1.
Figure 5:
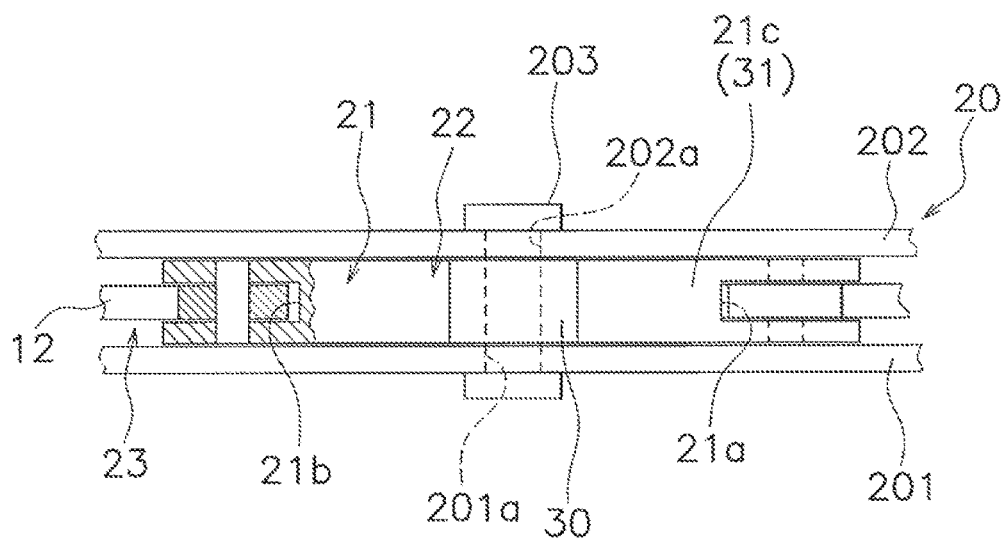
FIG. 5 is a view of FIG. 4 as seen from arrow A.

FIGS. 3 to 5 show the torque fluctuation inhibiting device 14. FIG. 3 is a schematic front view of the hub flange 12 and the torque fluctuation inhibiting device 14. FIG. 4 is a detailed view of part of FIG. 3, whereas FIG. 5 is a view of FIG. 4 as seen from direction A. It should be noted that FIGS. 3 and 4 show a condition that one of inertia rings (near-side inertia ring) is detached.

The torque fluctuation inhibiting device 14 includes first and second inertia rings 201 and 202, which compose an inertia ring 20 as a mass body, four drag mechanisms, each of which includes a centrifugal element 21 and a cam mechanism 22, and a restriction mechanism 23. When relative displacement is produced between the hub flange 12 and the inertia ring 20 in the rotational direction, each drag mechanism produces a circumferential force directed to reduce the relative displacement.

<First and Second Inertia Rings 201 and 202>

Each of the first and second inertia rings 201 and 202 is a continuous annular plate having a predetermined thickness. As shown in FIG. 5, the first and second inertia rings 201 and 202 are disposed axially on the both sides of the hub flange 12 such that a predetermined gap is produced between the hub flange 12 and each inertia ring 201, 202. In other words, the hub flange 12 and the first and second inertia rings 201 and 202 are disposed in axial alignment. The first and second inertia rings 201 and 202 have a common rotational axis that is the same as the rotational axis of the hub flange 12. The first and second inertia rings 201 and 202 are rotatable with the hub flange 12, and are also rotatable relatively to the hub flange 12.

Each of the first and second inertia rings 201 and 202 includes holes 201a, 202a, each of which axially penetrates therethrough. Additionally, the first and second inertia rings 201 and 202 are fixed by rivets 203 that penetrate the holes 201a and 202a thereof. Therefore, the first inertia ring 201 is axially, radially and rotation-directionally immovable with respect to the second inertia ring 202.

<Hub Flange 12>

The hub flange 12 has a disc shape, and as described above, is coupled at the inner peripheral part thereof to the output hub 5. The hub flange 12 is provided with four protruding portions 121 on the outer peripheral part thereof. Each protruding portion 121 protrudes from the outer peripheral part to the further outer peripheral side, and has a predetermined width in the circumferential direction. Each protruding portion 121 is provided with a recessed portion 122 having a predetermined width in the circumferentially middle part thereof. The recessed portion 122 is opened radially outward and has a predetermined depth.

<Centrifugal Elements 21>

The centrifugal elements 21 are composed of two first centrifugal elements 211 and two second centrifugal elements 212. In the following explanation, the four centrifugal elements 211 and 212 will be simply referred to as "the centrifugal elements 21" in a collective manner on an as-needed basis. The two first centrifugal elements 211 are disposed in opposed positions, and put differently, are disposed away from each other at angular intervals of 180 degrees. Likewise, the two second centrifugal elements 212 are disposed away from each other at angular intervals of 180 degrees. Each adjacent pair of first and second centrifugal elements 211 and 212 is disposed at an angular interval of 90 degrees.

The centrifugal elements 21 are disposed in the recessed portions 122 of the hub flange 12, respectively, and are radially movable by centrifugal forces generated in rotation of the hub flange 12. Each centrifugal element 21 has a circumferentially extending shape and includes grooves 21a and 21b on the both circumferential ends thereof. Each groove 21a, 21b has a larger thickness than the hub flange 12, and the hub flange 12 is inserted into part of each groove 21a, 21b.

It should be noted that an outer peripheral surface 21c of each centrifugal element 21 dents in a circular-arc shape to the inner peripheral side, and as described below, functions as a cam 31.

Additionally as shown in FIG. 4, each centrifugal element 21 includes a first guide roller 26a, a second guide roller 26b, and pins 27 by which the first and second guide rollers 26a and 26b are rotatably supported, respectively.

The first guide roller 26a is disposed in the groove 21a provided on one end of each centrifugal element 21, whereas the second guide roller 26b is disposed in the groove 21b provided on the other end of each centrifugal element 21. Each of the first and second guide rollers 26a and 26b is composed of an outer peripheral side rolling element and an inner peripheral side rolling element disposed on the inner peripheral side of the outer peripheral side rolling element. The first guide roller 26a is capable of rolling in contact with a sidewall 122a in each recessed portion 122, whereas the second guide roller 26b is capable of rolling in contact with a sidewall 122b located on the opposite side of the sidewall 122a in each recessed portion 122.

The pins 27 are provided to penetrate the grooves 21a and 21b of each centrifugal element 21 in a rotational axis direction. The both ends of each pin 27 is fixed to each centrifugal element 21.

<Restriction Mechanism 23>

The restriction mechanism 23 is a mechanism for restricting radially outward movement of the two second centrifugal elements 212 disposed in opposition to each other. Specifically, the restriction mechanism 23 restricts movement of each second centrifugal element 212 such that the cam 31 and a roller 30 as a cam follower are not in contact with each other in the cam mechanism 22 (to be described) relevant to each second centrifugal element 212.

As shown in FIG. 3, the restriction mechanism 23 includes a link mechanism 24 and a link drive mechanism 25.

The link mechanism 24 includes four links composed of a first link 24a, a second link 24b, a third link 24c and a fourth link 24d.

The first and fourth links 24a and 24d are turnably coupled at one ends thereof to one of the two second centrifugal elements 212 through a pin. The second and third links 24b and 24c are turnably coupled at one ends thereof to the other of the second centrifugal elements 212 through a pin.

Additionally, the hub flange 12 is provided with two grooves 12a, elongated in the radial direction, on the inner peripheral side of the two first centrifugal elements 211. Pins 12b are attached to the grooves 12a so as to be movable in the radial direction.

Moreover, the first and fourth links 24a and 24d are turnably coupled at the other ends thereof to the pins 12b, respectively. The second and third links 24b and 24c are turnably coupled at the other ends thereof to the pins 12b, respectively.

The link drive mechanism 25 includes a piston 25a, driven by hydraulic pressure, and a cylinder 25b. The piston 25a is turnably coupled to one of the two pins 12b through a rod 25c. On the other hand, the cylinder 25b is turnably coupled to the other of the pins 12b through a rod 25d.

In the configuration described above, when the hydraulic pressure is supplied to the interior of the cylinder 25b from a hydraulic supply mechanism not shown in the drawings, the rods 25c and 25d, coupled to the piston 25a and the cylinder 25b, are moved radially outward. Accordingly, the other ends of the respective links 24a to 24d are moved radially outward, and the second centrifugal elements 212, to which the respective links 24a to 24d are coupled at one ends thereof, are moved radially inward. In other words, actuation of the second centrifugal elements 212 is restricted.

<Cam Mechanisms 22>

Each cam mechanism 22 is composed of the roller 30 and the cam 31. The roller 30 is provided as a cam follower and has a cylindrical shape. The cam 31 corresponds to an outer peripheral surface 21c of each centrifugal element 21. The roller 30 is fitted to the outer periphery of the trunk of each rivet 203. In other words, the roller 30 is supported by each rivet 203. It should be noted that preferably, the roller 30 is rotatably attached to each rivet 203, but alternatively, may be non-rotatably attached thereto. The cam 31 is a circular-arc surface with which the roller 30 makes contact. The roller 30 is moved along the cam 31 when the hub flange 12 and the first and second inertia rings 201 and 202 are rotated relatively to each other in a predetermined angular range.

Although described below in detail, with the contact between each roller 30 and each cam 31, when rotational phase difference is produced between the hub flange 12 and the first and second inertia rings 201 and 202, a centrifugal force generated in each centrifugal element 21 is converted into a circumferential force by which the rotational phase difference is reduced.

[Actuation of Cam Mechanisms 22]

Actuation of each cam mechanism 22 (inhibition of torque fluctuations) will be explained with FIG. 6. It should be noted that in the following explanation, the pair of first and second inertia rings 201 and 202 will be simply referred to as "an inertia ring 20" on an as-needed basis.

In the lock-up on state, a torque transmitted to the front cover 2 is transmitted to the hub flange 12 through the input-side rotor 11 and the damper 13.

When torque fluctuations do not exist in torque transmission, the hub flange 12 and the inertia ring 20 are rotated in the condition shown in FIG. 3. In this condition, the roller 30 in each cam mechanism 22 is contacted to the most inner peripheral position (circumferential middle position) of the cam 31, and the rotational phase difference between the hub flange 12 and the inertia ring 20 is "0".

As described above, the rotation-directional relative displacement between the hub flange 12 and the inertia ring 20 is referred to as "rotational phase difference". In FIG. 6, these terms indicate angular displacement θ between the circumferential middle position of each centrifugal element 21 and each cam 31 and the center position of each roller 30.

Figure 6:
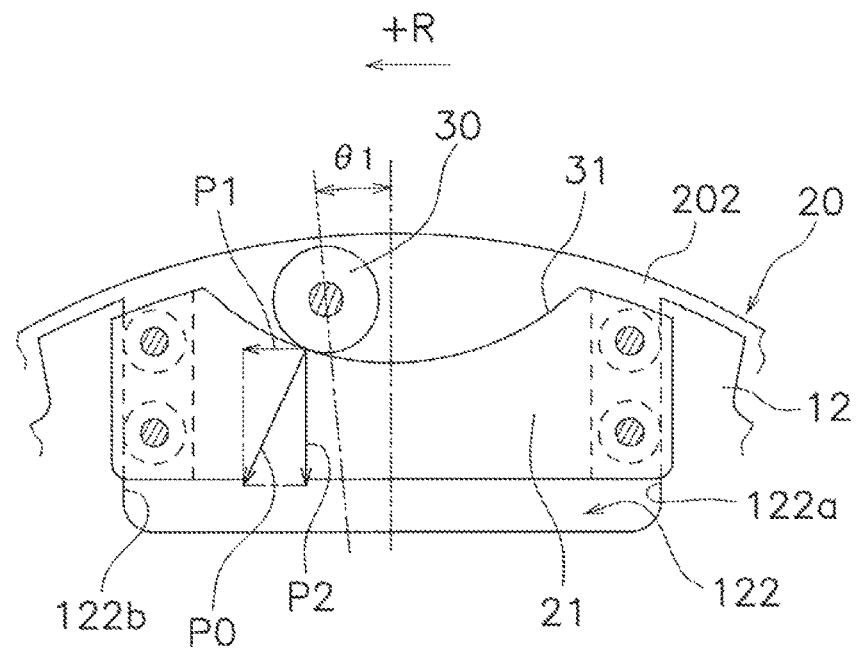
FIG. 6 is a diagram for explaining actuation of each cam mechanism.

When torque fluctuations herein exist in torque transmission, rotational phase difference is produced between the hub flange 12 and the inertia ring 20 as shown in FIG. 6. FIG. 6 shows a condition that rotational phase difference +θ (e.g., 5 degrees) is produced to a +R side.

As shown in FIG. 6, when the rotational phase difference +θ is produced between the hub flange 12 and the inertia ring 20, the roller 30 in each cam mechanism 22 is relatively moved along the cam 31 to the left side in FIG. 6. At this time, a centrifugal force acts on each centrifugal element 21. Hence, a reaction force to be received by the cam 31 provided on each centrifugal element 21 from the roller 30 has a direction and a magnitude indicated by P0 in FIG. 6. A first force component P1 and a second force component P2 are produced by the reaction force P0. The first force component P1 is directed in the circumferential direction, whereas the second force component P2 is directed to move each centrifugal element 21 to the inner peripheral side.

Additionally, the first force component P1 acts as a force to move the hub flange 12 leftward in FIG. 6 through each cam mechanism 22 and each centrifugal element 21. In other words, a force directed to reduce the rotational phase difference between the hub flange 12 and the inertia ring 20 is supposed to act on the hub flange 12. On the other hand, the second force component P2 moves each centrifugal element 21 to the inner peripheral side against the centrifugal force.

It should be noted that when the rotational phase difference is reversely produced, the roller 30 is relatively moved along the cam 31 to the right side in FIG. 6. However, the aforementioned actuation principle is also true of this case.

As described above, when the rotational phase difference is produced between the hub flange 12 and the inertia ring 20 by torque fluctuations, the hub flange 12 receives a force (first force component P1) directed to reduce the rotational phase difference between the both by the centrifugal force acting on each centrifugal element 21 and the working of each cam mechanism 22. Torque fluctuations are inhibited by this force.

The aforementioned force inhibiting torque fluctuations varies in accordance with the centrifugal force, in other words, the rotational speed of the hub flange 12, and also varies in accordance with the rotational phase difference and the shape of each cam 31. Therefore, by suitably setting the shape of each cam 31, characteristics of the torque fluctuation inhibiting device 14 can be made optimal in accordance with the specification of the engine and so forth.

For example, each cam 31 can be made in a shape that makes the first force component P1 linearly vary in accordance with the rotational phase difference in a condition where the centrifugal force acting is constant. Alternatively, each cam 31 can be made in a shape that makes the first force component P1 non-linearly vary in accordance with the rotational phase difference.

Now, a type of vehicle, equipped with the cylinder deactivation function, is capable of selecting, for instance, a normal operating mode and a cylinder deactivation mode. The normal operating mode is selected to operate the vehicle in a normal condition, and all of four cylinders are supplied with fuel. The cylinder deactivation mode is selected to operate the vehicle in a low load condition and so forth, and only two of the four cylinders are supplied with fuel. In this case, the normal operating mode and the cylinder deactivation mode are different from each other not only in combustion order but also in torque fluctuations. Therefore, it is required to change vibration inhibiting characteristics of the torque fluctuation inhibiting device 14 in accordance with which one of the operating modes is selected.

In view of the above, the present device is configured to cause a controller 110 to control the operating mode of the engine 100 and control the torque converter 1 in accordance with the operating mode.

Specifically, when the normal operating mode is selected, the hydraulic pressure is not supplied to the link drive mechanism 25 of the restriction mechanism 23. Because of this, movement of the second centrifugal elements 212 is not restricted, and all the four centrifugal elements, composed of the first and second centrifugal elements 211 and 212, are enabled to be radially actuated by centrifugal forces.

On the other hand, when the cylinder deactivation mode is selected, the hydraulic pressure is supplied to the link drive mechanism 25 of the restriction mechanism 23. Accordingly, the rods 25c and 25d, coupled to the piston 25a and the cylinder 25b, are moved radially outward, and the other ends of the respective links 24a to 24d are moved radially outward. Because of this, the second centrifugal elements 212, to which one ends of the respective links 24a to 24d are coupled, are moved radially inward, and the cam 31 provided on each second centrifugal element 212 is supposed to be forcibly separated from the roller 30 as a cam follower. In other words, the two second centrifugal elements 212 are not moved outward even when centrifugal forces act thereon. Therefore, the cam mechanisms 22, including the cams 31 provided on the two second centrifugal elements 212, are not actuated.

As described above, the number of the centrifugal elements 21 to be actuated can be changed by the actuation of the restriction mechanism 23. Therefore, the characteristics of the torque fluctuation inhibiting device 14 can be changed in accordance with the normal operating mode and the cylinder deactivation mode that are different in combustion order, whereby vibration can be effectively inhibited in the respective operating modes.

[Exemplary Characteristics]

Figure 7:
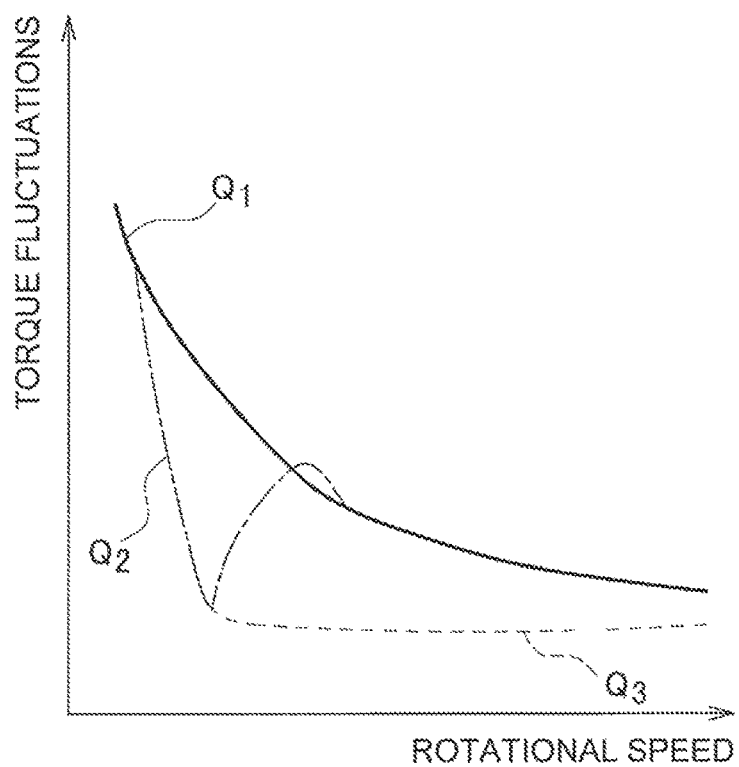
FIG. 7 is a characteristic diagram showing a relation between rotational speed and torque fluctuations.

FIG. 7 is a chart showing exemplary torque fluctuation inhibiting characteristics. The horizontal axis indicates rotational speed, whereas the vertical axis indicates torque fluctuations (rotation velocity fluctuations). Characteristic Q1 indicates a condition without installation of a device for inhibiting torque fluctuations; characteristic Q2 indicates a condition with installation of a well-known dynamic damper device without any cam mechanism; and characteristic Q3 indicates a condition with installation of the torque fluctuation inhibiting device 14 of the present preferred embodiment. It should be noted that the characteristic Q3 is obtained when the four centrifugal elements 21 are all actuated.

As is obvious from FIG. 7, in an apparatus in which the well-known dynamic damper device without any cam mechanism is installed (characteristic Q2), torque fluctuations can be inhibited only in a specific rotational speed range. By contrast, in the condition with installation of the cam mechanisms 22 of the present preferred embodiment (characteristic Q3), torque fluctuations can be inhibited through the entire rotational speed ranges.

Other Preferred Embodiments

The present invention is not limited to the preferred embodiment described above, and a variety of changes or modifications can be made without departing from the scope of the present invention.

(a) The configuration of the restriction mechanism is not limited to that in the aforementioned preferred embodiment. For example, the link mechanism may be configured to be electrically driven. Additionally, the respective centrifugal elements may be configured to be moved by electric control without using the link mechanism.

(b) The number of centrifugal elements in the entire device and the number of centrifugal elements to be restricted are not limited to those in the aforementioned preferred embodiment. However, at least one pair of centrifugal elements, opposed to each other through the rotational center, is desirably set as the centrifugal elements to be restricted. Additionally, the shape, weight and so forth of each centrifugal element to be restricted may be set differently from those of each centrifugal element not to be restricted such that when all the centrifugal elements are actuated, the actuations thereof can be made uniform.

(c) In the aforementioned preferred embodiment, the hub flange is provided with the centrifugal elements. Alternatively, the inertia ring may be provided with the centrifugal elements.

(d) In the aforementioned preferred embodiment, each drag mechanism is composed of the centrifugal element and the cam mechanism. However, the configuration of each drag mechanism is not limited to that in the aforementioned preferred embodiment as long as when rotational phase difference is produced between the hub flange and the inertia ring, each drag mechanism generates a circumferential force by which the rotational phase difference is reduced.

Application Examples

The torque fluctuation inhibiting device described above can be disposed in a variety of settings when applied to a torque converter or other types of power transmission device. Specific application examples will be hereinafter explained with use of schematic diagrams of the torque converter and the other types of power transmission device.

Figure 8:
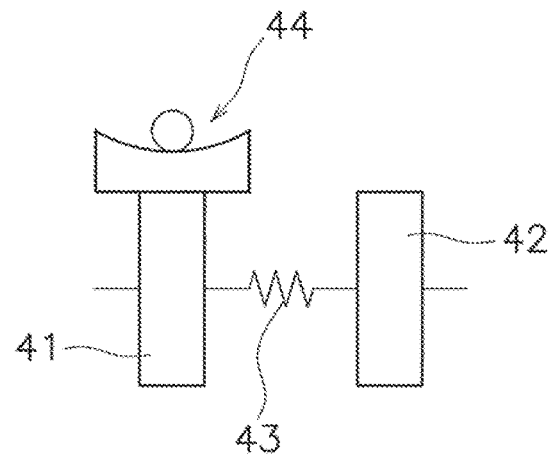
FIG. 8 is a schematic diagram showing application example 1 of the present invention.

(1) FIG. 8 is a diagram schematically showing a torque converter. The torque converter includes an input-side rotor 41, a hub flange 42 and a damper 43 disposed between the both members 41 and 42. The input-side rotor 41 includes members such as a front cover, a drive plate and a piston. The hub flange 42 includes a driven plate and a turbine hub. The damper 43 includes a plurality of torsion springs.

In the example shown in FIG. 8, a centrifugal element is provided on any of the rotary members composing the input-side rotor 41, and a cam mechanism and a restriction mechanism are collectively provided as a cam-mechanism and restriction-mechanism unit 44 actuated with use of a centrifugal force acting on the centrifugal element. A configuration applicable to the cam-mechanism and restriction-mechanism unit 44 is similar to that in the aforementioned preferred embodiment.

Figure 9:
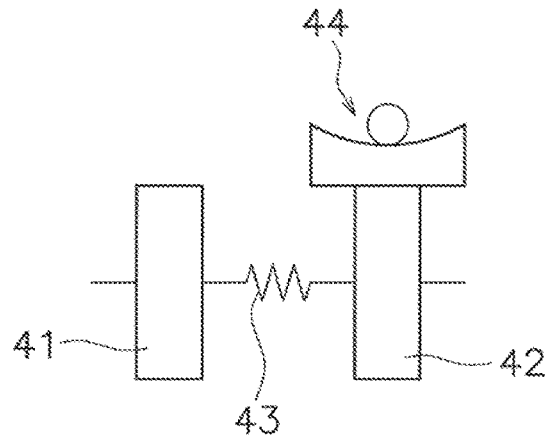
FIG. 9 is a schematic diagram showing application example 2 of the present invention.

(2) In a torque converter shown in FIG. 9, a centrifugal element is provided on any of the rotary members composing the hub flange 42, and the cam-mechanism and restriction-mechanism unit 44 is provided to be actuated with use of a centrifugal force acting on the centrifugal element. A configuration applicable to the cam-mechanism and restriction-mechanism unit 44 is similar to that in the aforementioned preferred embodiment.

Figure 10:
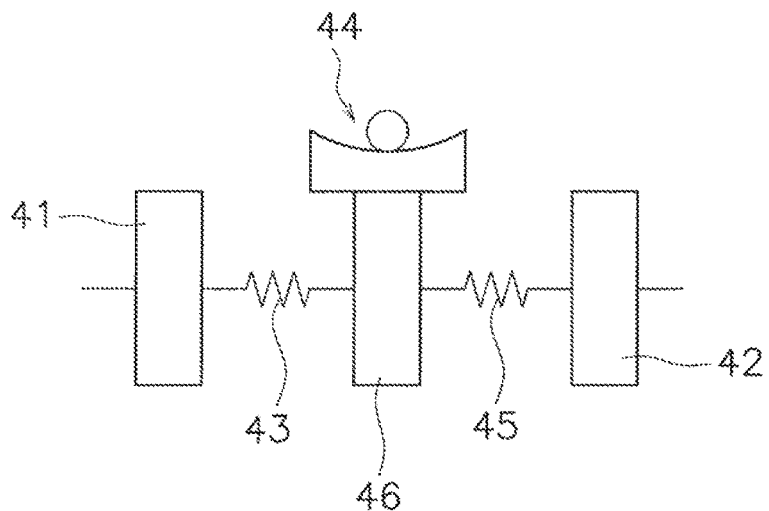
FIG. 10 is a schematic diagram showing application example 3 of the present invention.

(3) A torque converter shown in FIG. 10 includes another damper 45 and an intermediate member 46 provided between the two dampers 43 and 45 in addition to the configurations shown in FIGS. 8 and 9. The intermediate member 46 is rotatable relatively to the input-side rotor 41 and the hub flange 42, and makes the two dampers 43 and 45 act in series.

In the example shown in FIG. 10, a centrifugal element is provided on the intermediate member 46, and the cam-mechanism and restriction-mechanism unit 44 is provided to be actuated with use of a centrifugal force acting on the centrifugal element. A configuration applicable to the cam-mechanism and restriction-mechanism unit 44 is similar to that in the aforementioned preferred embodiment.

Figure 11:
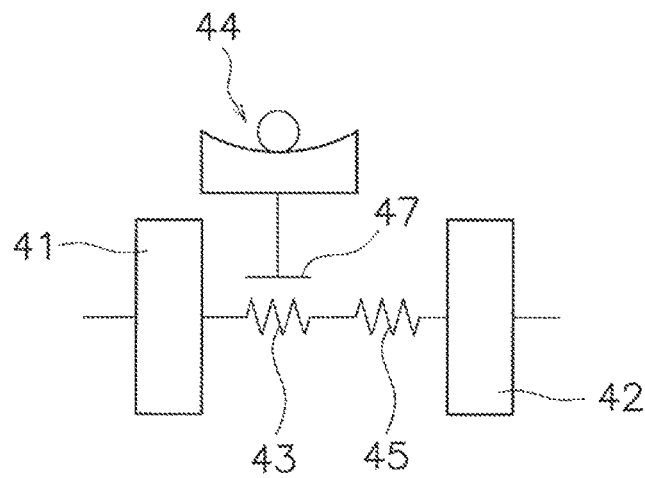
FIG. 11 is a schematic diagram showing application example 4 of the present invention.

(4) A torque converter shown in FIG. 11 includes a float member 47. The float member 47 is a member for supporting the torsion springs composing the damper 43. For example, the float member 47 has an annular shape and is disposed to cover the torsion springs from the outer peripheral side and at least one lateral side. Additionally, the float member 47 is rotatable relatively to the input-side rotor 41 and the hub flange 42, and is rotated together with the damper 43 by friction with the torsion springs of the damper 43. In other words, the float member 47 is also rotated.

In the example shown in FIG. 11, the float member 47 is provided with a centrifugal element, and the cam-mechanism and restriction-mechanism unit 44 is provided to be actuated with use of a centrifugal force acting on the centrifugal element. A configuration applicable to the cam-mechanism and restriction-mechanism unit 44 is similar to that in the aforementioned preferred embodiment.

Figure 12:
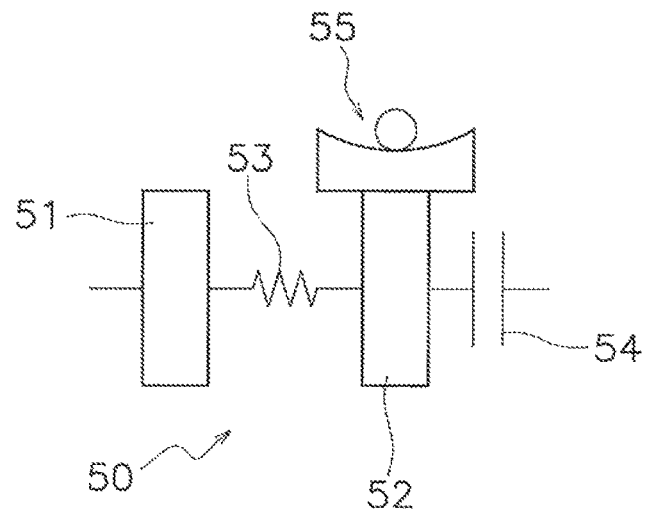
FIG. 12 is a schematic diagram showing application example 5 of the present invention.

(5) FIG. 12 is a schematic diagram of a power transmission device that includes a flywheel 50, composed of two inertia bodies 51 and 52, and a clutch device 54. In other words, the flywheel 50, disposed between the engine and the clutch device 54, includes the first inertia body 51, the second inertia body 52 and a damper 53. The second inertia body 52 is disposed to be rotatable relatively to the first inertia body 51. The damper 53 is disposed between the two inertia bodies 51 and 52. It should be noted that the second inertia body 52 is composed of rotary members including a clutch cover composing the clutch device 54.

In the example shown in FIG. 12, any of the rotary members composing the second inertia body 52 is provided with a centrifugal element, and a cam mechanism and a restriction mechanism are collectively provided as a cam-mechanism and restriction-mechanism unit 55 actuated with use of a centrifugal force acting on the centrifugal element. A configuration applicable to the cam-mechanism and restriction-mechanism unit 55 is similar to that in the aforementioned preferred embodiment.

Figure 13:
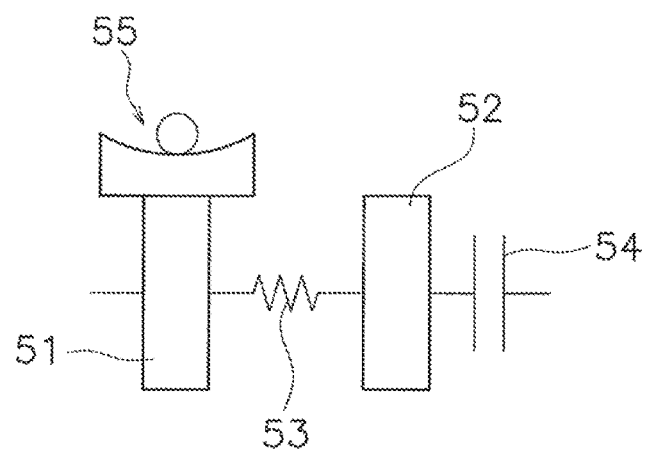
FIG. 13 is a schematic diagram showing application example 6 of the present invention.

(6) FIG. 13 shows an example of a power transmission device similar to that in FIG. 12. In this example, the first inertia body 51 is provided with a centrifugal element. Additionally, the cam-mechanism and restriction-mechanism unit 55 is provided to be actuated with use of a centrifugal force acting on the centrifugal element. A configuration applicable to the cam-mechanism and restriction-mechanism unit 55 is similar to that in the aforementioned preferred embodiment.

Figure 14:
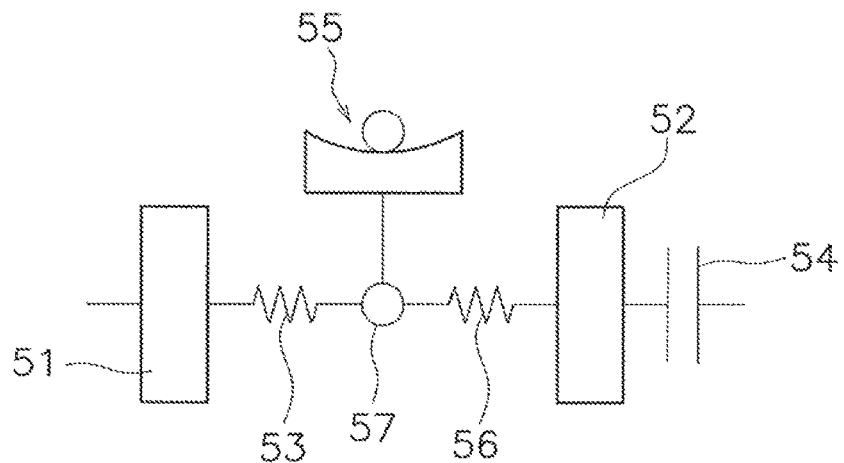
FIG. 14 is a schematic diagram showing application example 7 of the present invention.

(7) A power transmission device shown in FIG. 14 includes another damper 56 and an intermediate member 57 provided between the two dampers 53 and 56 in addition to the configurations shown in FIGS. 12 and 13. The intermediate member 57 is rotatable relatively to the first and second inertia bodies 51 and 52.

In the example shown in FIG. 14, a centrifugal element is provided on the intermediate member 57, and the cam-mechanism and restriction-mechanism unit 55 is provided to be actuated with use of a centrifugal force acting on the centrifugal element. A configuration applicable to the cam-mechanism and restriction-mechanism unit 55 is similar to that in the aforementioned preferred embodiment.

Figure 15:
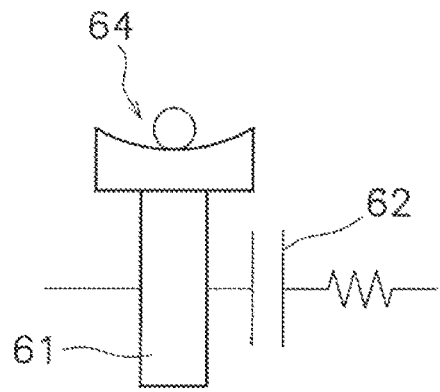
FIG. 15 is a schematic diagram showing application example 8 of the present invention.

(8) FIG. 15 is a schematic diagram of a power transmission device that a clutch device is provided on one flywheel. In FIG. 15, a first inertia body 61 includes one flywheel and a clutch cover of a clutch device 62. In this example, a centrifugal element is provided on any of the rotary members composing the first inertia body 61, and a cam mechanism and a restriction mechanism are collectively provided as a cam-mechanism and restriction-mechanism unit 64 actuated with use of a centrifugal force acting on the centrifugal element. A configuration applicable to the cam-mechanism and restriction-mechanism unit 64 is similar to that in the aforementioned preferred embodiment.

Figure 16:
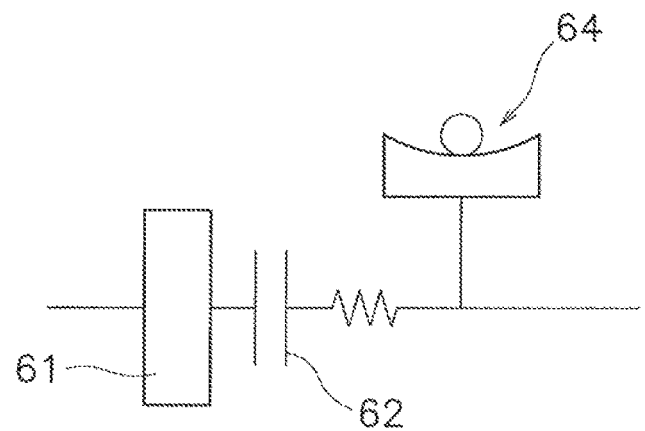
FIG. 16 is a schematic diagram showing application example 9 of the present invention.

(9) FIG. 16 shows an example of a power transmission device similar to that shown in FIG. 15. In this example, a centrifugal element is provided on an output side of the clutch device 62. Additionally, the cam-mechanism and restriction-mechanism unit 64 is provided to be actuated with use of a centrifugal force acting on the centrifugal element. A configuration applicable to the cam-mechanism and restriction-mechanism unit 64 is similar to that in the aforementioned preferred embodiment.

(10) The torque fluctuation inhibiting device according to the present invention may be disposed on any of the rotary members composing the transmission, and furthermore, may be disposed on an output-side shaft (a propeller shaft or a drive shaft) of the transmission, although these configurations are not shown in the drawings.

(11) As another application example, the torque fluctuation inhibiting device of the present invention may be further applied to a heretofore well-known dynamic damper device or a power transmission device provided with a pendulum-type damper device.

What is claimed is:

1. A torque fluctuation inhibiting device for inhibiting torque fluctuations in a rotor to which a torque is inputted, the torque fluctuation inhibiting device comprising:
   a mass body disposed to be rotatable with the rotor and to be rotatable relative to the rotor;
   a plurality of drag mechanisms, each configured to generate a circumferential force when a relative displacement is produced between the rotor and the mass body in a rotational direction, the circumferential force directed to reduce the relative displacement; and
   a restriction mechanism configured to restrict actuation of one or more of the plurality of drag mechanisms,
   the plurality of drag mechanisms include
   a plurality of centrifugal elements each disposed to receive a centrifugal force generated in rotation of the rotor and the mass body, and
   a plurality of cam mechanisms configured to convert the centrifugal force acting on each of the plurality of centrifugal elements into the circumferential force, each of the plurality of cam mechanisms including a cam provided on each of the plurality of centrifugal elements and a cam follower provided on the mass body, the cam follower adapted to be moved along the cam.

2. The torque fluctuation inhibiting device according to claim 1, wherein
   the restriction mechanism is further configured to restrict actuation of one or more of the plurality of centrifugal elements in the one or more of the plurality of drag mechanisms.

3. The torque fluctuation inhibiting device according to claim 1, wherein
   the rotor receives the torque inputted thereto from an engine including a plurality of cylinders, and
   the restriction mechanism restricts actuation of the one or more of the plurality of centrifugal elements, a number of the one or more of the plurality of centrifugal elements set in accordance with a number of one or more deactivated cylinders in the plurality of cylinders.

4. The torque fluctuation inhibiting device according to claim 1, wherein the restriction mechanism restricts the one or more of the plurality of centrifugal elements from moving radially outward.

5. The torque fluctuation inhibiting device according to claim 1, wherein
   the plurality of centrifugal elements are put into one or more pairs of centrifugal elements opposed to each other through a rotational center of the rotor, and
   the one or more of the plurality of centrifugal elements restricted from being actuated by the restriction mechanism corresponds to at least one of the one or more pairs of centrifugal elements opposed to each other.

6. The torque fluctuation inhibiting device according to claim 1, wherein
   the restriction mechanism is further configured to cause the cam and the cam follower to be not in contact with each other.

7. The torque fluctuation inhibiting device according to claim 1, wherein
   the rotor includes a plurality of recessed portions on an outer peripheral surface thereof, each of the plurality of recessed portions disposed to open radially outward, and
   each of the plurality of recessed portions accommodates each of the plurality of centrifugal elements.

8. The torque fluctuation inhibiting device according to claim 1, wherein
   the mass body includes a first inertia ring, a second inertia ring and a pin, the first and second inertia rings opposed to each other through the rotor, the pin coupling the first and second inertia rings to each other so as to make the first and second inertia rings non-rotatable relatively to each other,
   each of the plurality of centrifugal elements is disposed on an outer peripheral part of the rotor and on an inner peripheral side of the pin while being disposed between the first inertia ring and the second inertia ring in an axial direction,
   the cam follower is a cylindrical roller, the cylindrical roller including a hole that an interior thereof is penetrated by the pin in the axial direction, and
   the cam is provided on each of the plurality of centrifugal elements so as to make contact with the cam follower, the cam having a shape making the circumferential force vary in accordance with an amount of the relative displacement between the rotor and the mass body in the rotational direction.

9. A torque converter disposed between an engine and a transmission, the torque converter comprising:
   an input-side rotor to which a torque is inputted from the engine;
   an output-side rotor outputting the torque to the transmission;
   a damper disposed between the input-side rotor and the output-side rotor; and
   the torque fluctuation inhibiting device recited in claim 1.

10. A power transmission device comprising:
    a flywheel including a first inertia body, a second inertia body and a damper, the first inertia body adapted to be rotated about a rotational axis, the second inertia body adapted to be rotated about the rotational axis, the second inertia body rotatable relatively to the first inertia body, the damper disposed between the first inertia body and the second inertia body;
    a clutch device provided on the second inertia body of the flywheel; and
    the torque fluctuation inhibiting device recited in claim 1.

* * * * *